United States Patent [19]

Rosenkranz et al.

[11] 4,035,455
[45] July 12, 1977

[54] METHOD FOR BLOW MOLDING A HOLLOW PLASTIC ARTICLE HAVING A CONCAVE BASE

[75] Inventors: Otto Rosenkranz; Karl-Heinrich Seifert, both of Hamburg, Germany

[73] Assignee: Heindenreich & Harbeck, Germany

[21] Appl. No.: 614,058

[22] Filed: Sept. 16, 1975

Related U.S. Application Data

[63] Continuation of Ser. No. 345,072, March 26, 1973, abandoned.

[30] Foreign Application Priority Data

May 8, 1972 Germany .......................... 2222535

[51] Int. Cl.² ...................................... B29C 17/07
[52] U.S. Cl. .............................. 264/40.3; 264/40.5; 264/89; 264/94; 264/296
[58] Field of Search .................. 264/40, 89, 90, 92, 264/93, 94, 96–99, 296, 40.3, 40.5; 425/140, 149, DIG. 214, DIG. 231

[56] References Cited

U.S. PATENT DOCUMENTS

| 688,924 | 12/1901 | Blair et al. | 264/97 UX |
|---|---|---|---|
| 2,123,552 | 7/1938 | Helwig | 425/140 |
| 2,952,875 | 9/1960 | Herrick | 425/140 |
| 3,496,257 | 2/1970 | Brown et al. | 264/40 |
| 3,666,849 | 5/1972 | Williams et al. | 264/40 |
| 3,764,644 | 10/1973 | Robinson | 264/296 X |
| 3,819,789 | 6/1974 | Parker | 264/296 X |
| 3,865,530 | 2/1975 | Jesselallee et al. | 425/DIG. 216 |

*Primary Examiner*—Jan H. Silbaugh

[57] ABSTRACT

In a blow-moulding process, the base of a hollow plastics body is formed initially of convex configuration and then a portion of the base is deformed inwardly to provide a concave area surrounded by an annular support surface. Deformation of the base is controlled in response to an increase of pressure in the mold cavity after termination of venting thereof.

3 Claims, 11 Drawing Figures

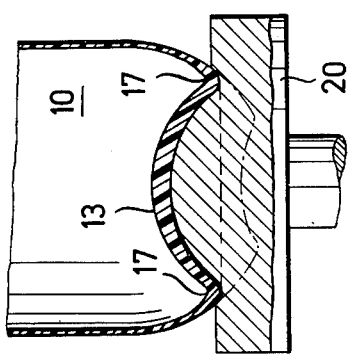
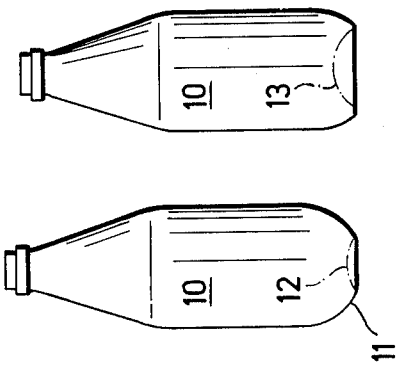
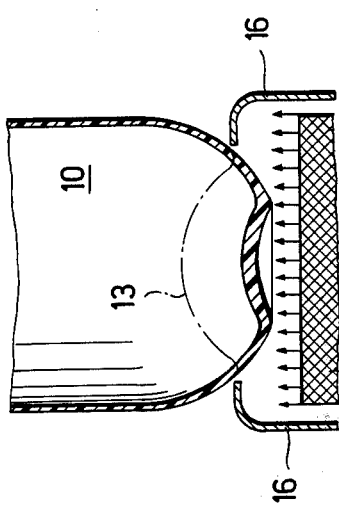
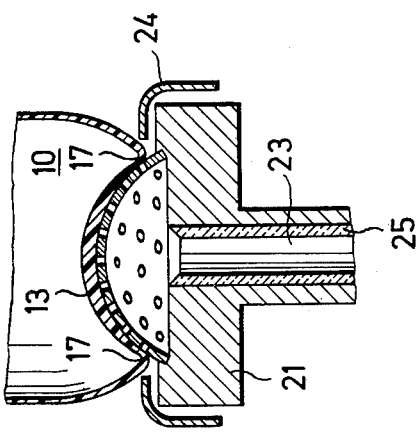
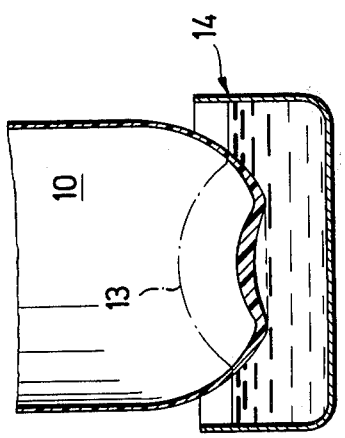
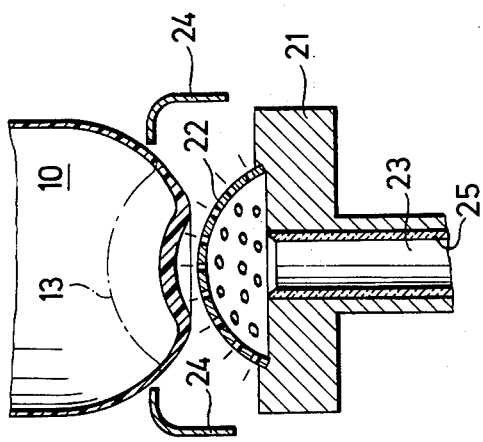

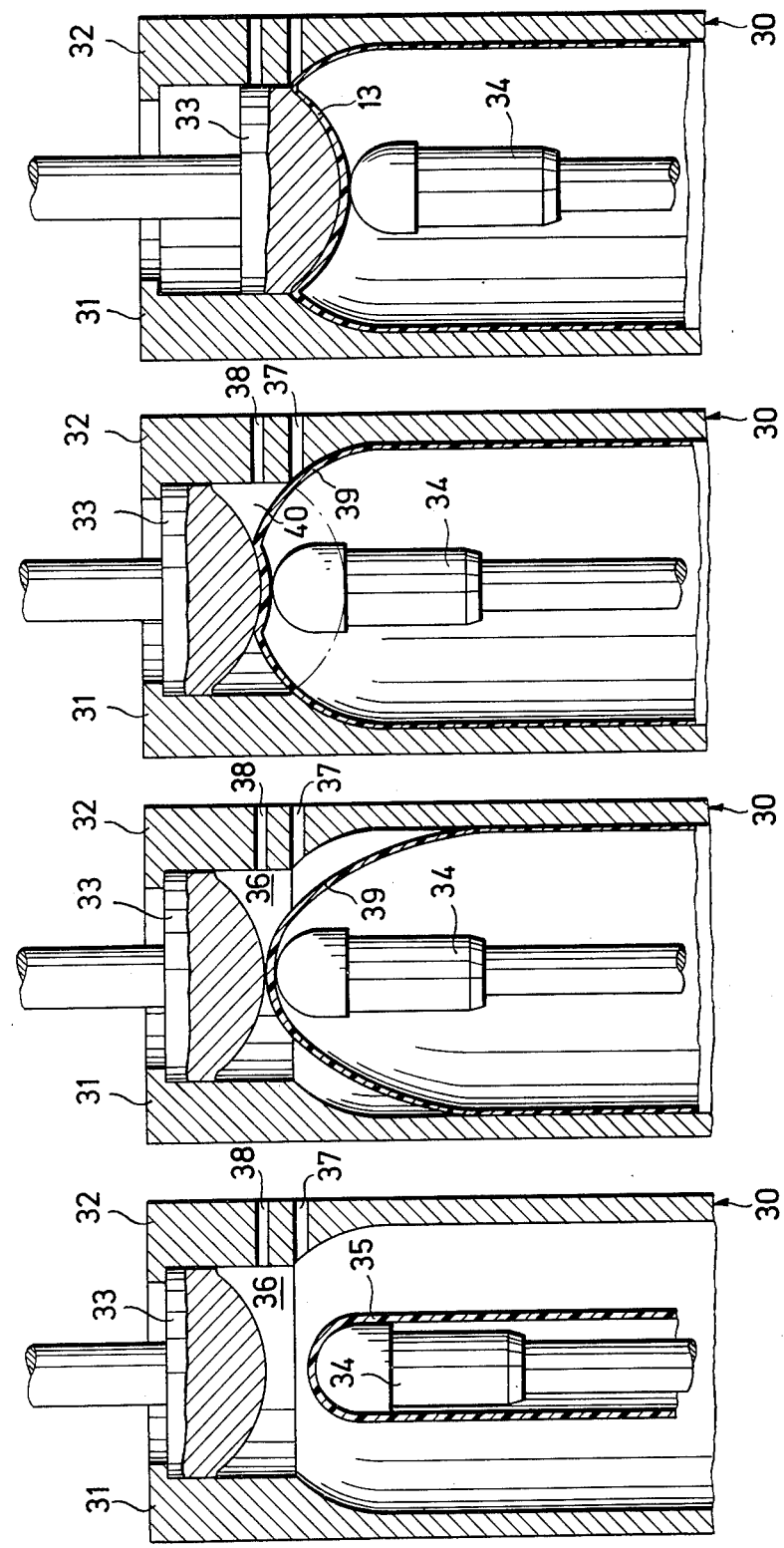

METHOD FOR BLOW MOLDING A HOLLOW PLASTIC ARTICLE HAVING A CONCAVE BASE

This is a continuation of Ser. No. 345,072, filed on Mar. 26, 1973, now abandoned.

BACKGROUND OF THE INVENTION

The invention relates to a method for strengthening the base of a hollow plastics blow-moulded body, particularly a plastics bottle intended to withstand high internal pressures such as aerosol containers and the like.

The usual cylindrical wall portion of such plastic containers is subjected predominantly to tensile stresses which plastics materials can withstand, especially when they are orientated biaxially by low temperature blow-moulding. At the transition between the cylindrical wall and the base, which must have a supporting surface so that the container can stand sufficiently firmly, a bending stress is encountered which, however, plastics materials cannot readily withstand because of their comparatively low elasticities. This leads to breakage or deformation of the containers, especially after a long period of storage or with high storage temperatures.

In order to remove these disadvantages, the transition from the cylindrical container wall to the supporting surface of the base can be modified or adapted as shown in German Pat. Specification No. 1,607,895, but it is essential to maintain a minimum diameter for the base support surface in order than an empty container shall have sufficient stability. In addition, one can achieve a concentration of material near the base of the container by regulating the thickness of the wall of the preformed blank from which the container is produced during extrusion or by suitably shaping the preformed blank during injection.

Also, at least three standing feet can be moulded on to a convexly curved base of a container as shown in German Gebrauchsmuster No. 1,950,569, or a support ring of a different material may be attached to the base, the latter measure being indeed sufficient but requiring additional parts and manufacturing steps.

However, attempts to produce a pressure-proof container using a minimum quantity of plastics material have lead to difficulties when forming the base. Thus, the measures described above, if the amount of material employed is to be kept to a minimum, are not satisfactory when producing containers for liquids having a high carbonic acid content or high internal pressures and large volumes of, for example, more than half a liter. The only exception to this is the use of a convexly curved base with an additional support ring. But this arrangement is more expensive and more complicated.

As already stated, for the base of a pressure-proof container which must possess sufficient stability without additional support, the transition from the cylindrical wall to the area within the supporting surface is vital. The radius of curvature of the area within the supporting surface should be as small as possible so that the bending moment in this region can be kept small. In addition, the diameter of the supporting surface must be as large as possible for a light bottle or other container to have sufficient stability. Any inward curving of the base must be such as to withstand the internal pressures to which it is likely to be subjected. None of the blow-moulding processes hitherto proposed can fulfill all the above-stated conditions.

In an extrusion blowing process it is difficult to form a small-radius, concavely curved base portion. Because of the grip of the bottom tools, the permissible concavity allowed in the base is limited. Although a small-radius concavity can be produced relatively easily this can be achieved only by substantial reduction of the wall thickness in this area of the base. The strength of the base is thus considerably reduced. Moreover, because of the longitudinal weld normally used in such processes, the containers cannot be subjected to high internal pressures.

Injection blow-moulding or similar processes, which employ a preformed blank which is already closed at one end, generally permit strengthening by biaxial orientation of the plastics material, do not have a longitudinal weld and are therefore employed in preference for the production of pressure-resistant containers. Thermoplastic materials which can be blown are substantially tougher in the thermoelastic temperature zone than in the thermoplastic zone. Consequently, the formation of impressed contours and also small-radius concavities is limited when there is strong curvatuve of the bottom. However, if pressures are applied which bring about impressed contour moulding, the thickness of the wall in the drawn-out area is considerably reduced.

Normally, at least with large volume containers, the only solution is to produce containers having convex bases and to attach support rings to them. The object of the invention is accordingly to manufacture a pressure-resistant container in a simple and convenient manner, with a small outley in a material.

SUMMARY OF THE INVENTION

A hollow body is formed by blow-moulding with a convex base and then an area of the base is deformed inwardly with the production of an annular supporting surface. The base of the hollow body can be deformed inwardly after being reheated; however, the base of the hollow body can alternatively be deformed inwardly while it is still warm from the blow-moulding process.

The apparatus used includes a slidable die which deforms inwardly a portion of the base which is curved outwardly in the blowing process. The die may be a bottom part of a blow mould, with the die starting to press into the base portion of the hollow body as soon as the preformed blank has reached a determined inflated condition.

The process according to the invention enables a small-radius, concave curvature to be imparted to the base of the hollow body in a simple and convenient manner. Bulging of the base at high internal pressures is avoided and a large diameter annular support surface can be obtained which gives good stability, especially when one is filling an empty bottle. In addition, the shape of the base is such that one avoids the familiar "creep effect", that is the gradual partial reversion of the base into a wholly convex configuration under pressure and at increased temperatures.

BRIEF DESCRIPTION OF THE DRAWINGS

FIG. 1 is a side view of a bottle with a convexly curved base,

FIG. 2 shows heating of the base of the bottle in a dipping bath,

FIG. 3 shows heating of the base of the bottle by radiation,

FIG. 4 shows shaping of the base of the bottle with a die,

FIG. 5 shows heating of the base of the bottle with the aid of a die,

FIG. 6 shows deformation of the base of the bottle with the die illustrated in FIG. 5, FIG. 7 is a side view of the finished bottle, FIG. 8 is a sectional view of a blow-moulding apparatus at the commencement of a blow-moulding operation, FIG. 9 is a correspondig view after a first stage of the blow-moulding operation, FIG. 10 is a further view of the apparatus after a further stage of the operation, and FIG. 11 shows a final stage of the blow-moulding operation.

DESCRIPTION OF THE PREFERRED EMBODIMENTS

A bottle 10 with an outwardly curved base 11 as shown in FIG. 1 is produced by a blow-moulding process, without a bottom weld and is strengthened by biaxial orientation of the plastics material. A small inward curvature 12 may be formed in the base if desired.

The base 11 is then heated at moulding temperature in the region of the supporting surface which is to be formed. A die having the shape of the recess 13 to be produced now forces the mouldable area inwardly. No material, or at least only a small amount, is stretched during this inward deformation. As a result one obtains a curved base which includes a large diameter annular support surface surrounding a concave portion having a small radius of curvature. The base 11 as a whole is of considerable wall strength.

During the re-shaping process, the bottle 10 is supported against unwanted inward deformation by connecting it to a source of compressed air. The cold die remains in contact with the base of the bottle until the latter has hardened by cooling. The finished product is a highly pressure-resistant, light bottle of thermoplastic material with good stability, as illustrated in FIG. 7.

As shown in FIG. 2 it is possible to heat the base of the bottle 10 to be moulded by means of a heated dipping bath 14. FIG. 3 illustrates heating of the bottle 10 by means of infra-red heating 15, the area of the base to be heated being limited by reflectors 16. FIG. 4 shows a die 20 which produces the inward deformation 13 with formation of an annular supporting surface 17. The die 20 itself is either cold or is cooled. During deformation of the base area, the bottle 10 is again supported by connecting it to a source of compressed air.

FIGS. 5 and 6 illustrate a modified arrangement in which a die 21 is used which comprises a perforated plate 22 and a channel 23. In order to heat the base of the bottle 10, hot air is fed through the channel 23 and emerges through the perforations of the plate 22. Reflectors 24 are again provided to limit the area which is heated. The base of the bottle is then deformed by forcing in the perforated die 21 and cold compressed air is thereafter fed through the channel 23 and forced through the openings in the die. The small mass of the perforated die enables it to adapt rapidly to the changes in temperatures. The channel 23 can be provided with a lining 25 of a thermally insulating material.

In the arrangements described above, the bottle is moulded and the base subsequently reheated. However, deformation of the base can be effected without any subsequent reheating as part of the blow-moulding operation. As shown in FIGS. 8 to 11, a large diameter annular support surface and a small-radius concave recess with uniform wall thickness can be obtained in contrast to the usual blowing method with which either a small-radius recess is not attainable or the plastics material must be stretched resulting in variations in wall thickness.

FIG. 8 is a sectional view of a blow mould 30 which consists of two halves 31 and 32, a die 33 constituting a bottom mould, and an injection lance 34 on which a preformed blank 35 is arranged. The lower part of the blow mould is not illustrated but is designed in the usual way to form a bottle neck between the halves 31 and 32 and the injection lance 34. The connection for leading air into the injection lance 34 is also not shown. Die 33 is arranged so as to slide in an opening 36 of the blow mould 30 and is propelled by an unshown operating device. In addition, two holes 37 and 38 open into the blow mould; the lower hole 37 serves as a positioning check hole and is connected to the atmosphere, while the upper hole 38 is connected via a pressure-responsive valve (not illustrated), linked with the operating device for die 33, to a pressure or vacuum source, also not shown.

FIG. 8 shows the preformed blank 35 in the original state at the commencement of the blowing operation, when die 33 is in the upper position. In FIG. 9 the blowing operation has progressed to the point where the plastics material has already reached die 33 and is partially in contact with the mould halves 31 and 32.

As shown in FIG. 10, blowing has progressed to a condition in which the lower hole 37 is closed by the plastics material 39. Consequently, the build-up of an under or over pressure in the hollow space 40 between the plastics material 39 and the die 33 can be measured through the upper hole 38. This alteration in pressure is converted into a control signal by the pressure-responsive valve which actuates the operating device of the die, as a result of which die 33 is propelled downwards, causing the bottom of the bottle to be correspondingly inwardly deformed as shown in FIG. 11. Thus, the die 33 is moved into contact with the inflated blank in response to the pressure within the mold attaining a predetermined value after the lower hole 37 is covered. Injection lance 34 is withdrawn, since it must not interfere with this operation. The movement of die 33 may be controlled on either a pressure of a time basis.

What is claimed is:

1. The method of blow molding a synthetic plastic hollow body having concave base in a mold having an elongated cavity and a convex movable die selectively movable into the cavity to form the concave base, comprising the steps of placing a heated hollow blank of synthetic plastic within the mold cavity, introducing compressed gas into said heated blank, inflating said blank within said cavity, venting the cavity through an aperture adjacent said die, covering the aperture with the blank during inflation of the blank to terminate venting of the cavity, moving the die into the cavity into engagement with the inflated blank to form a concave base thereon in response to an increase in pressure in the mold after venting is terminated, and cooling the shaped blank.

2. The method of blow molding a synthetic plastic hollow body having a concave base in a mold having an elongated cavity provided with a vent opening adjacent the base portion thereof and a convex movable die selectively movable into the cavity to form the concave base, comprising the steps of placing a blowable, hollow blank of synthetic plastic within the mold cavity, introducing compressed gas within said heated blank inflating said blank within said cavity, covering the cavity vent opening with the blank during its inflation, sensing the increase in gas pressure within the mold cavity after said opening is covered, moving the die into the cavity into engagement with the inflated blank to form a concave base thereon when said sensed gas pressure attains a predetermined value, and cooling the shaped blank.

3. The method as defined in claim 2, wherein the blank is supported on an injection lance, and said lance is withdrawn during movement of the die into engagement with the inflated blank.

* * * * *